T. E. MURRAY.
COUPLING FOR FLANGED TUBES OR PIPES.
APPLICATION FILED MAR. 8, 1917.

1,273,524.

Patented July 23, 1918.

Inventor
Thomas E. Murray
By his Attorney
Park Benjamin

UNITED STATES PATENT OFFICE.

THOMAS E. MURRAY, OF NEW YORK, N. Y.

COUPLING FOR FLANGED TUBES OR PIPES.

1,273,524.　　　　　Specification of Letters Patent.　　Patented July 23, 1918.

Application filed March 8, 1917. Serial No. 153,269.

*To all whom it may concern:*

Be it known that I, THOMAS E. MURRAY, a citizen of the United States, residing at New York, in the county of New York and State of New York, have invented a certain new and useful Improvement in Couplings for Flanged Tubes or Pipes, of which the following is a specification.

The invention relates to couplings for flanged tubes or pipes, and consists in the construction more particularly hereinafter set forth.

In the accompanying drawings—

Figure 1:
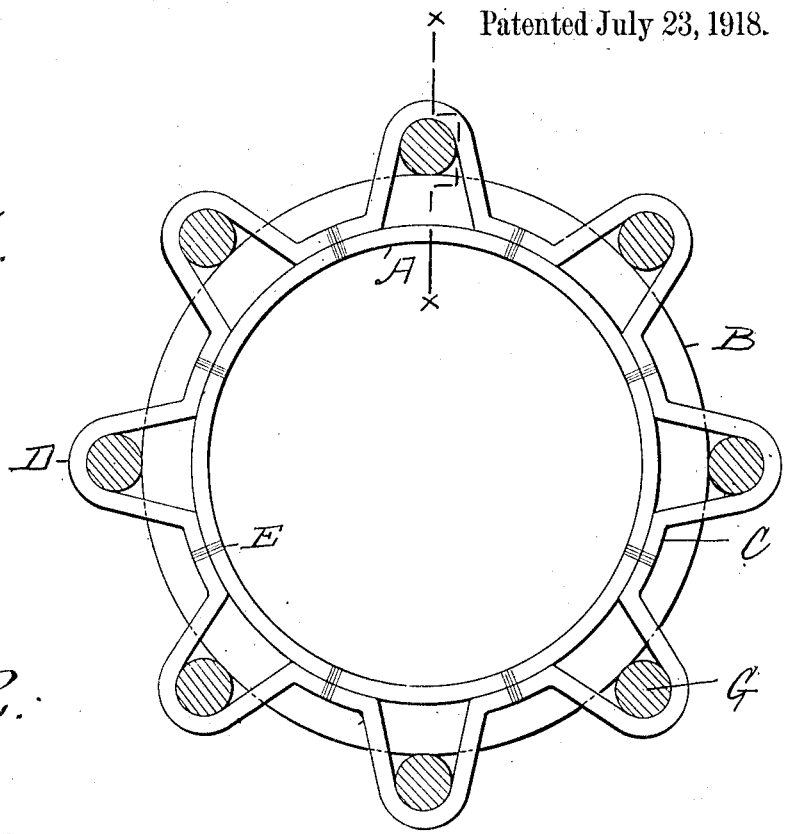
Figure 2:
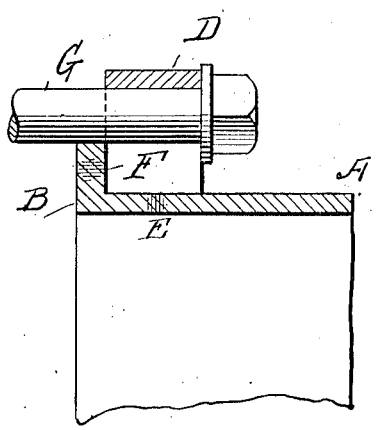

Figure 1 is a plan view of my coupling, Fig. 2 is a section on the line $x$, $x$ of Fig. 1.

Similar letters of reference indicate like parts.

A is a pipe or tube, having an integral end flange B. C is a metal ring received upon said tube and bent in a plurality of places to form a series of loops D extending radially beyond the circumference of said flange B, said bent loops being preferably at equal intervals apart. The ring C may be electrically welded to tube A at points E between the loops D. The edges of said ring may also be electrically welded at points F to flange B.

In coupling together two flanged pipes or tubes similar to A, headed bolts G are passed through the opposing loops D.

I claim—

1. A tube, an end flange thereon, and a ring bent in a plurality of places to form a series of loops of greater radial length than said flange and projecting beyond the circumference thereof, the said ring being in contact with said flange.

2. A tube, end flange and ring, as in claim 1, the intermediate portions of said ring between said loops being welded to said tube.

3. A tube, an end flange thereon, and a ring bearing against said flange and having a plurality of radially projecting loops extending beyond the circumference of said flange; the intermediate portions of said ring between said loops being welded to said tube, and the said loops being edge welded to said flange.

In testimony whereof I have affixed my signature in presence of two witnesses.

THOMAS E. MURRAY.

Witnesses:
　GERTRUDE T. PORTER,
　MAY T. MCGARRY.